US011549439B2

(12) United States Patent
Abele et al.

(10) Patent No.: US 11,549,439 B2
(45) Date of Patent: Jan. 10, 2023

(54) METHOD AND ADAPTER STRUCTURE FOR INSTALLING A COMPRESSOR AND A GAS TURBINE

(71) Applicant: Siemens Energy Global GmbH & Co. KG, Bayern (DE)

(72) Inventors: Michael Abele, Rosstal (DE); Kai Stockhausen, Düsseldorf (DE); Oliver Tobias Walk, Essen (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/284,052

(22) PCT Filed: Sep. 16, 2019

(86) PCT No.: PCT/EP2019/074687
§ 371 (c)(1),
(2) Date: Apr. 9, 2021

(87) PCT Pub. No.: WO2020/078636
PCT Pub. Date: Apr. 23, 2020

(65) Prior Publication Data
US 2021/0404384 A1    Dec. 30, 2021

(30) Foreign Application Priority Data

Oct. 18, 2018    (DE) .................... 10 2018 217 823.2

(51) Int. Cl.
*F02C 7/20*    (2006.01)
*F01D 25/28*    (2006.01)
(Continued)

(52) U.S. Cl.
CPC ................ *F02C 7/20* (2013.01); *F01D 25/28* (2013.01); *F16M 5/00* (2013.01); *F16M 7/00* (2013.01);
(Continued)

(58) Field of Classification Search
CPC .......... F01D 25/28; F01D 25/285; F02C 7/20; F05D 2230/80; F05D 2240/91; F16M 7/00; F16M 5/00
See application file for complete search history.

(56) References Cited

U.S. PATENT DOCUMENTS 2,885,165 A    5/1959 Stanley
3,036,375 A    5/1962 Schlosser, Jr.
(Continued)

FOREIGN PATENT DOCUMENTS

DE    719876 C    4/1942
DE    3103581 A1    9/1982
(Continued)

OTHER PUBLICATIONS

International search report and written opinion dated Oct. 12, 2019, for corresponding PCT/EP2019/074687.
(Continued)

*Primary Examiner* — Bradley Duckworth
(74) *Attorney, Agent, or Firm* — Wolter Van Dyke Davis, PLLC

(57) ABSTRACT

A method for installing a compressor and a gas turbine of a first type at a position of an existing power plant where previously a compressor and a gas turbine of a second type were installed on a foundation specially designed for the second type. The two types differ from each other at least with respect to the position and/or the number of anchoring points at which the compressor and the gas turbine are connected to the foundation via support structures. The installation of the new compressor and the new gas turbine is carried out using an adapter structure on the existing foundation. A corresponding adapter structure is provided.

18 Claims, 3 Drawing Sheets

(51) Int. Cl.
  *F16M 5/00* (2006.01)
  *F16M 7/00* (2006.01)

(52) U.S. Cl.
  CPC ...... *F05D 2220/32* (2013.01); *F05D 2230/60* (2013.01); *F05D 2230/80* (2013.01); *F05D 2240/91* (2013.01)

(56) References Cited

U.S. PATENT DOCUMENTS

| | | | |
|---|---|---|---|
| 4,850,091 A | | 7/1989 | Stadelmann |
| 9,810,093 B2* | | 11/2017 | Tsukidate ................. F02C 7/36 |
| 10,047,635 B2* | | 8/2018 | Reddy Asani ........... F16M 1/04 |
| 10,662,818 B2* | | 5/2020 | Demianovich ....... F01D 25/285 |
| 10,794,287 B2* | | 10/2020 | Giancotti ................. F16M 1/04 |
| 2011/0016881 A1 | | 1/2011 | Ruiz et al. |
| 2012/0186070 A1* | | 7/2012 | Dalessandro ...... H02K 15/0006 29/592.1 |
| 2014/0250916 A1 | | 9/2014 | Cabeen et al. |
| 2015/0184591 A1* | | 7/2015 | Giancotti ................ F01D 25/28 60/798 |
| 2017/0248034 A1* | | 8/2017 | Dzieciol ............... F01D 25/285 |
| 2021/0381398 A1* | | 12/2021 | Walk ........................ F01D 9/06 |

FOREIGN PATENT DOCUMENTS

| | | |
|---|---|---|
| EP | 0246470 A1 | 11/1987 |
| EP | 2278128 A2 | 1/2011 |
| GB | 702487 A | 1/1954 |
| GB | 2094448 A | 9/1982 |

OTHER PUBLICATIONS

PCT International Search Report and Written Opinion of International Searching Authority dated Dec. 10, 2019 corresponding to PCT International Application No. PCT/EP2019/074687 filed Sep. 16, 2019 (previously cited).

\* cited by examiner

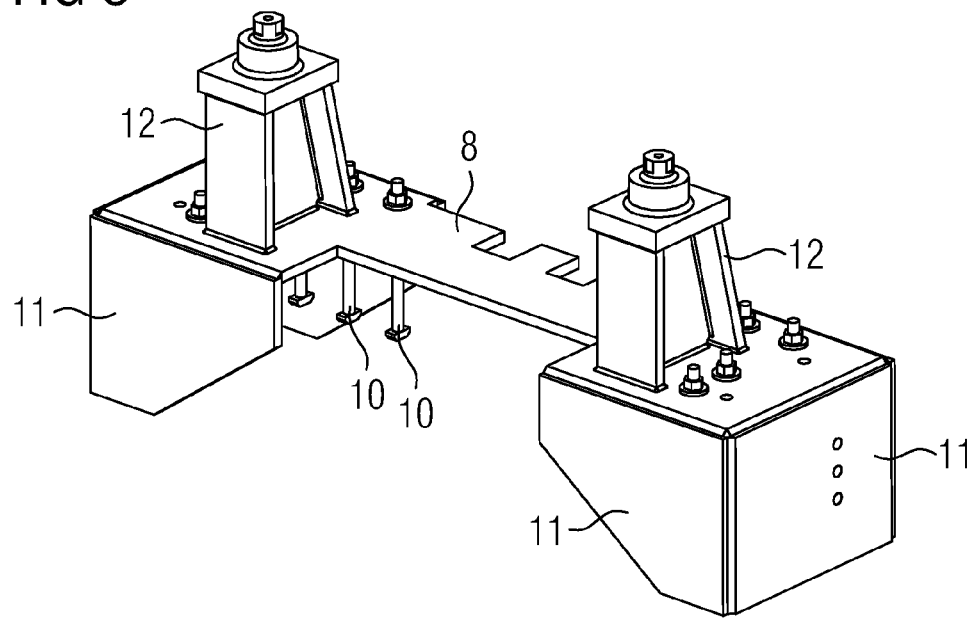
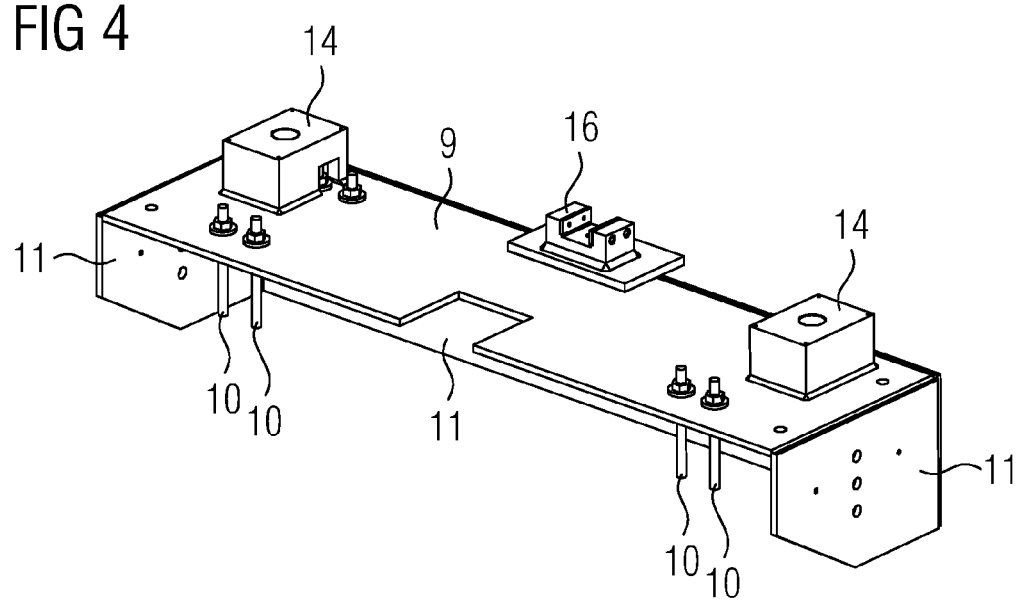

METHOD AND ADAPTER STRUCTURE FOR INSTALLING A COMPRESSOR AND A GAS TURBINE

CROSS REFERENCE TO RELATED APPLICATIONS

This application is the US National Stage of International Application No. PCT/EP2019/074687 filed 16 Sep. 2019, and claims the benefit thereof. The International Application claims the benefit of German Application No. DE 10 2018 217 823.2 filed 18 Oct. 2018. All of the applications are incorporated by reference herein in their entirety.

FIELD OF INVENTION

The invention concerns a method for installing a compressor and a gas turbine of a first type at a position of an existing power plant at which previously a compressor and a gas turbine of a second type were installed on a foundation specially designed for said second type, wherein the types differ from each other at least with respect to the position and/or the number of anchoring points at which the compressor and the gas turbine are connected to the foundation directly and/or via supporting structures.

BACKGROUND OF INVENTION

Compressors and gas turbines are installed in power plants on foundations specially designed for these. In other words, each foundation is designed to provide anchoring points at the positions and in the numbers at which the compressor and the gas turbine are to be connected to the foundation via their own supporting structures, in order to be able to transfer weight forces and operating forces occurring during operation into the foundation via the supporting structures. The position and number of the anchoring points are type-specific and established by the manufacturer. Accordingly, they vary from one manufacturer to the next. Thus compressors and gas turbines from a first manufacturer cannot be attached to foundations which were designed to receive compressors and gas turbines from a second manufacturer. If compressors and gas turbines of a power plant must be replaced, the power plant operator in this situation normally chooses to order the new compressor and new gas turbine from the same manufacturer who supplied the components to be replaced, even if an offer from a competing manufacturer is better. Only if the new components can no longer be sourced from the old manufacturer, because for example it is no longer in existence, is the offer from another manufacturer accepted. In this case, the old foundation is replaced by a new foundation which is then adapted accordingly, again specifically, to the new compressor and gas turbine to be installed. Replacement of a foundation is however very time-consuming, leading to long downtimes of the power plant, which entails correspondingly high costs. In addition, replacement of the foundation leads to a loss of the operating permit, so a new approval process must be initiated with unknown waiting times.

SUMMARY OF INVENTION

Starting from this prior art, it is an object of the present invention to create an alternative method of the type cited initially, which allows a power plant operator to replace compressors and gas turbines of a first type with those of a second type without suffering significant disadvantages as a result.

To achieve this object, the present invention provides a method of the type cited initially which is characterized in that the new compressor and the new gas turbine are installed on the existing foundation using an adapter structure. The adapter structure compensates in particular for the different positions and/or numbers of anchoring points of the two types, so the new compressor and the new gas turbine can be installed using their own supporting structures. An essential advantage associated with the method according to the invention is that compressors and gas turbines can be replaced by those of a different type without it being necessary to change or replace the existing foundation. Accordingly, despite the change of type, no additional downtimes of the power plant or approval processes are to be expected.

An embodiment of the present invention is characterized in that the existing foundation has several upwardly protruding foundation blocks, and that the adapter structure comprises a number of metallic base plates corresponding to the number of foundation blocks, on the top side of which superstructures are positioned which define anchoring points for the new compressor and/or the new gas turbine and/or for supporting structures of the new compressor and/or the new gas turbine, wherein the base plates are each positioned on one of the foundation blocks and attached thereto.

Preferably, the base plates are attached to the foundation blocks by existing anchor bolts which are anchored in the foundation blocks and the free ends of which protrude upwardly from the foundation blocks. Accordingly, no adaptation of the existing anchoring bolts is required for installing the base plates.

Advantageously, downwardly extending side walls are provided on the base plates, and during installation are positioned so as to bear laterally on the assigned foundation block. Accordingly, forces acting transversely to the vertical are conducted into the foundation not only via the anchoring bolts but also via these side walls.

The base plates and/or the side walls extending downwardly therefrom advantageously have a plate thickness of at least 40 mm. Thus the plate thickness of a base plate arranged below the compressor advantageously lies in the range from 90 to 110 mm, and the plate thickness of the base plate arranged below the gas turbine advantageously lies in the range from 40 to 60 mm.

According to one embodiment of the present invention, on the top side of a first base plate, at least two superstructures are provided in the form of compressor receiver blocks, on and/or to which the compressor to be installed or a respective supporting structure thereof is placed and/or attached. Differences in position and height between anchoring points of the old compressor and anchoring points of the new compressor can be compensated via such compressor receiver blocks.

On the top side of a second base plate, advantageously superstructures are provided in the form of gas turbine receiver blocks, to which supporting structures mounted on the gas turbine are attached. Differences in position and height between anchoring points of the old gas turbine and anchoring points of the new gas turbine can be compensated via such gas turbine receiver blocks.

According to one embodiment of the present invention, on the top side of the second base plate, a superstructure is provided in the form of a bracket to which a supporting structure is attached in the form of a center guide that is provided on the gas turbine to be installed. Forces acting transversely to the vertical can thus be transferred to the foundation via this bracket.

Furthermore, the present invention provides an adapter structure, which is characterized in that it is configured for attaching to foundation blocks of a foundation of a power plant and defines anchoring points for a compressor and/or a gas turbine and/or for supporting structures of a compressor and/or supporting structures of a gas turbine, wherein the compressor and/or the gas turbine is/are of a predefined type.

Preferably, the adapter structure comprises several metallic base plates, each of which is designed for arrangement on and fixing to one of the foundation blocks, wherein on the top sides of the base plates, superstructures are provided which define the anchoring points.

Advantageously, on the top side of a first base plate, at least two superstructures are provided in the form of compressor receiver blocks, which are configured such that the compressor and/or at least one compressor supporting structure can be placed thereon and/or attached thereto.

On the top side of a second base plate, advantageously superstructures are provided in the form of gas turbine receiver blocks, which are configured such that the gas turbine and/or at least one gas turbine supporting structure can be placed thereon and/or attached thereto.

Advantageously, on the top side of the second base plate, a superstructure is provided in the form of a bracket, which is configured such that a supporting structure can be attached thereto in the form of a center guide that is provided on the gas turbine to be installed.

According to an embodiment of the present invention, downwardly extending side walls are provided on the base plates, and are configured such that during installation of the respective base plate on one of the foundation blocks, they are positioned so as to bear thereon.

Advantageously, the base plates and/or the side walls extending downwardly therefrom have a plate thickness of at least 40 mm.

The invention furthermore proposes using such an adapter structure according to the invention in the performance of a method according to the invention.

BRIEF DESCRIPTION OF THE DRAWINGS

Further features and advantages of the present invention are explained in relation to the following description of a method according to one embodiment of the present invention with reference to the attached drawing. The drawing shows:

FIG. 3 an enlarged, perspective view of a first partial region of the adapter structure and anchoring bolts of the foundation; and FIG. 4 an enlarged, perspective view of a second partial region of the adapter structure and anchoring bolts of the foundation.

DETAILED DESCRIPTION OF INVENTION

Figure 1:
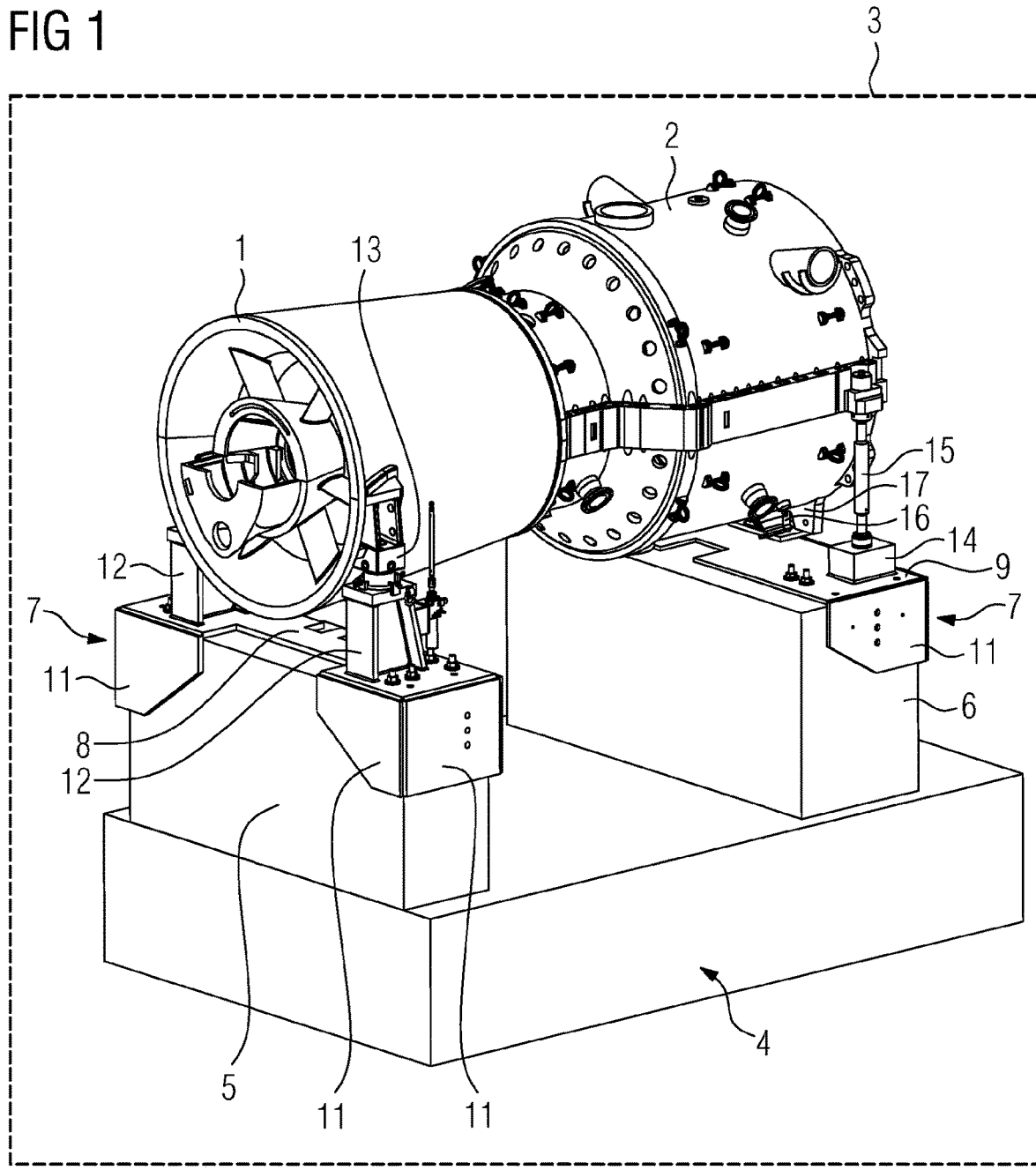
FIG. 1 a schematic, perspective view of a compressor and a gas turbine which are installed on a foundation of a power plant using an adapter structure.
Figure 2:
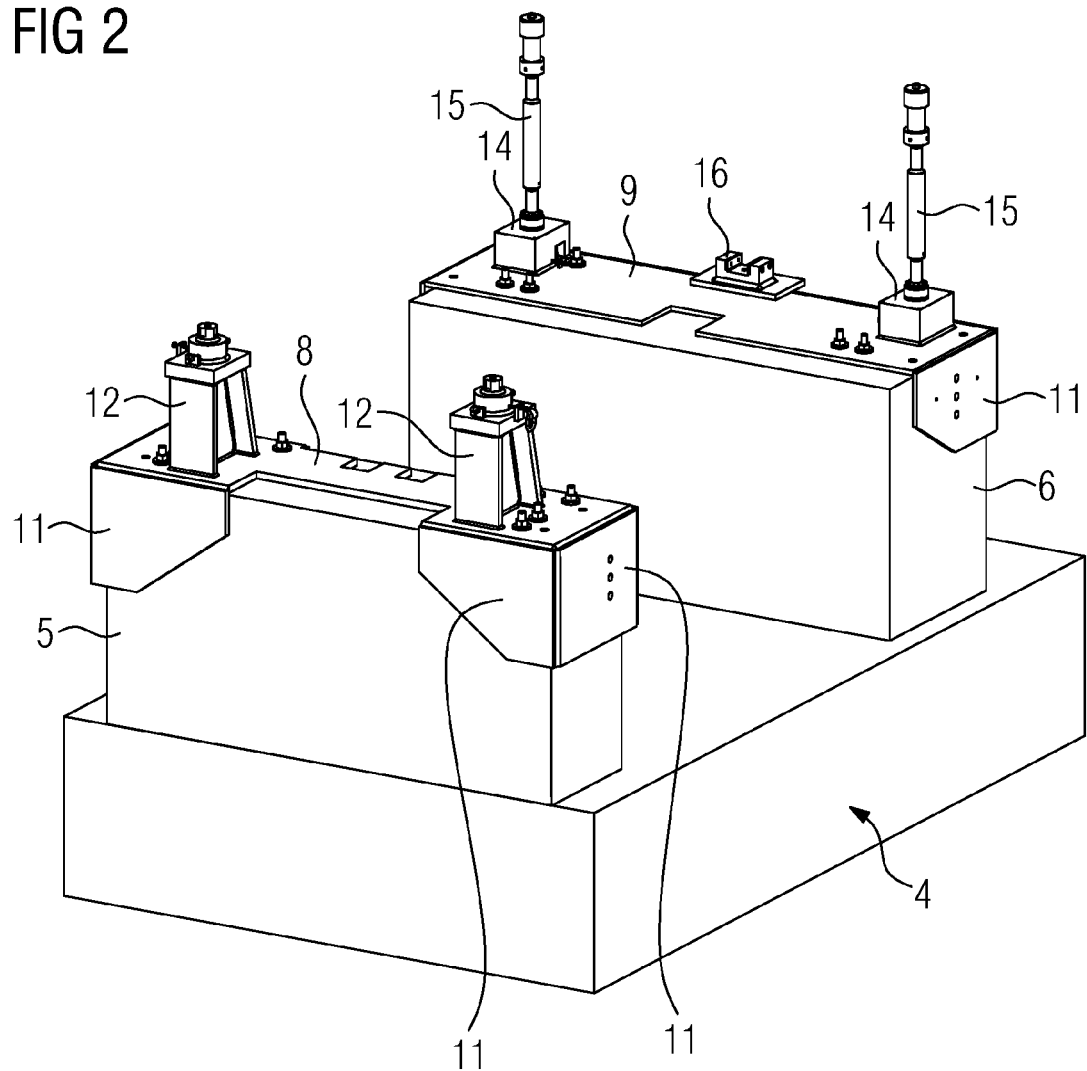
FIG. 2 a schematic, perspective view of the foundation illustrated in FIG. 1 with adapter structure arranged thereon.

FIG. 1 shows a compressor 1 and the gas turbine 2 of a first type, which are arranged on a foundation 4 inside a power plant 3. The foundation 4 is specifically designed for a compressor and a gas turbine of a second type, which is not shown in detail in the present case. The compressor 1 and the gas turbine 2 of the first type differ from the compressor and the gas turbine of the second type at least in that the position and the number of anchoring points are different at which the compressor and gas turbine are connected to the foundation 4 directly and/or via assigned supporting elements. Further differences may however also exist, in particular with respect to the external dimensions of the components. In order nonetheless to be able to install the compressor 1 and gas turbine 2 on the foundation 4, an adapter structure 7, which in the present case comprises two cuboid foundation blocks 5 and 6, is placed on the foundation 4 and compensates for the different positions and/or different numbers of anchoring points of the two types.

In the present case, the adapter structure 7 comprises two metallic base plates 8 and 9, which are each designed to be positioned on and attached to one of the foundation blocks 5, 6. The base plates 8 and 9 are fixed via the existing anchoring bolts 10 of the foundation 4, which are anchored in the foundation blocks 5 and 6 and the free ends of which protrude upwardly therefrom, as indicated in FIGS. 3 and 4. Respective side walls 11 extend vertically downwardly from the base plates 8 and 9 and are configured to be positioned in mounted state so as to bear laterally on the assigned foundation block 5, 6. In the case of the first base plate 8, the side walls 11 here bear on all four sides of the foundation block 5, while in the case of the base plate 9, they bear on three sides of foundation block 6. In the present case, the plate thickness of the first base plate 8 and its side walls 11 is 100 mm, and the plate thickness of the second base plate 9 and its side walls 11 is 50 mm. On the top sides of the base plates 8 and 9, respective superstructures are positioned which define anchoring points for supporting structures of the compressor 1 or gas turbine 2. In the present case, the base plate 8 comprises two superstructures in the form of compressor receiver blocks 12, on which the compressor supporting structures 13 are placed so that the compressor 1 rests on the compressor receiving blocks 12. The second base plate 9 firstly comprises superstructures in the form of two gas turbine receiver blocks 14, on which gas turbine supporting structures 15 are attached which, in the present case, are rod-like in form and are mounted on the gas turbine 2. Secondly, the second base plate 9 comprises a superstructure in the form of a bracket 16, arranged here in the middle, on which a supporting structure is attached in the form of a center guide 17 that is provided on the gas turbine 2. Via the compressor supporting structures 13 and gas turbine supporting structures 15, forces acting substantially vertically, in particular the weight forces of the compressor 1 and gas turbine 2, are transferred via the adapter structure 7 into the foundation 4. The center guide 17 serves primarily for transferring forces acting transversely to the vertical, which may occur during operation of the compressor 1 and the gas turbine 2, to the foundation 4 via the adapter structure 7.

For installing the compressor 1 and gas turbine 2 of the first type at the position of the power plant 3 at which previously a compressor and a gas turbine of a second type were installed on the foundation 4 specially designed for the second type, in a first step the adapter structure 7 is attached to the foundation 4. In other words, the base plates 8 and 9 are mounted on the foundation blocks 5 and 6 via the existing anchor bolts 10. In a second step, then the compressor 1 and gas turbine 2 are positioned with their supporting structures on the adapter structure 7, whereupon the compressor supporting structures 13, the gas turbine supporting structures 15 and the center guide 17 are attached to the assigned superstructures. Fixing may take place either releasably or permanently by means of a welding process or similar.

The essential advantage associated with the use of the adapter structure 7 is that the compressor 1 and gas turbine 2 may be mounted on the existing foundation blocks 5 and 6 even though these foundation blocks 5 and 6 were not designed to receive the compressor 1 and gas turbine 2. Accordingly, it is not necessary to change or replace the existing foundation 4. Thus despite the change of type, no additional downtimes for the power plant or approval processes are to be expected.

Although the invention has been illustrated and described in detail with reference to an exemplary embodiment, the invention is not restricted by the examples disclosed and other variants may be derived therefrom by the person skilled in the art without leaving the scope of protection of the invention.

The invention claimed is:

1. A method for installing a compressor and a gas turbine of a first type at a position of an existing power plant at which previously a compressor and a gas turbine of a second type were installed on an existing foundation specially designed for said second type, wherein the types differ from each other at least with respect to the position and/or a number of anchoring points at which the compressor and the gas turbine are connected to the foundation directly and/or via supporting structures, the method comprising:
installing the new compressor and the new gas turbine using an adapter structure on the existing foundation, wherein the existing foundation comprises several upwardly protruding foundation blocks, and
wherein the adapter structure comprises at least two metallic base plates corresponding to the number of foundation blocks, on a top side of which superstructures are positioned which define anchoring points for the new compressor and/or the new gas turbine and/or for supporting structures of the new compressor and/or the new gas turbine.

2. The method as claimed in claim 1,
further comprising: positioning and attaching the base plates on one of the foundation blocks.

3. The method as claimed in claim 2,
wherein the base plates are attached to the foundation blocks by existing anchor bolts which are anchored in the foundation blocks and free ends of which protrude upwardly from the foundation blocks.

4. The method as claimed in claim 2,
wherein downwardly extending side walls are provided on the base plates, and during installation are positioned so as to bear laterally on the assigned foundation block.

5. The method as claimed in claim 2,
wherein the base plates and the side walls extending downwardly therefrom have a plate thickness of at least 40 mm.

6. The method as claimed in claim 2,
wherein on the top side of a first base plate, at least two superstructures are provided on and/or to which the compressor to be installed or a respective supporting structure thereof is placed and/or attached.

7. The method as claimed in claim 2,
wherein on the top side of a second base plate, superstructures are provided to which supporting structures mounted on the gas turbine are attached.

8. The method as claimed in 7,
wherein on the top side of the second base plate, a superstructure is provided to which a supporting structure is attached in the form of a center guide that is provided on the gas turbine to be installed.

9. An adapter structure, comprising:
a first anchor point comprising: a first metallic base plate; at least one first metallic superstructure disposed thereon; and a first downward extending wall assembly extending downward therefrom; and
a second anchor point comprising: a second metallic base plate; and at least one second metallic superstructure disposed thereon; and a second downward extending wall assembly extending downward therefrom;
wherein each anchor point is configured to attach to a respective foundation block of a foundation of a power plant and is configured to anchor a compressor and/or a gas turbine and/or for supporting structures of a compressor and/or supporting structures of a gas turbine,
wherein each downward extending wall assembly comprises: two downwardly extending opposing side walls configured to bear on two opposite walls disposed therebetween of the respective foundation block; and a downwardly extending transverse side wall extending transversely between the two downwardly extending opposing side walls and configured to bear on a third wall of the respective foundation block that is transverse to the two opposite walls.

10. The adapter structure as claimed in claim 9,
wherein the at least one first metallic superstructure comprises at least two first metallic superstructures, each configured such that the compressor and/or at least one compressor supporting structure can be placed thereon and/or attached thereto.

11. The adapter structure as claimed in claim 9,
wherein the at least one second metallic superstructure comprises at least two second metallic superstructures, each configured such that the gas turbine and/or at least one gas turbine supporting structure can be placed thereon and/or attached thereto.

12. The adapter structure as claimed in claim 11,
the second anchor point further comprising a center guide bracket disposed atop the second metallic base plate and configured to receive a center guide that is provided on the gas turbine to be installed.

13. The adapter structure as claimed in claim 9, wherein the first downward extending wall assembly further comprises a second downwardly extending transverse side wall disposed between the two downwardly extending opposing side walls and configured to bear on a fourth wall of the respective foundation block that is transverse to the two opposite walls.

14. The adapter structure as claimed in claim 13, wherein the downwardly extending opposing side walls and the downwardly extending transverse side wall each comprise a plate thickness of at least 40 mm.

15. The adapter structure as claimed in claim 9,
wherein the first metallic base plate and the second metallic base plate each comprise a plate thickness of at least 40 mm.

16. The adapter structure as claimed in claim 9, wherein the first metallic base plate and the first downward extending wall assembly define at least two concave corners each configured to receive a respective convex corner of the respective foundation block.

17. The adapter structure as claimed in claim 16, wherein the second metallic base plate and the second downward extending wall assembly define at least two concave corners each configured to receive a respective convex corner of the respective foundation block.

18. The adapter structure as claimed in claim 9, wherein the first metallic base plate and the first downward extending wall assembly define four concave corners each configured to receive a respective convex corner of the respective foundation block.

* * * * *